(12) United States Patent
Munerato et al.

(10) Patent No.: US 10,138,753 B2
(45) Date of Patent: Nov. 27, 2018

(54) AUXILIARY FLUID DRIVEN ELECTRIC GENERATOR

(71) Applicants: Claudio Munerato, Bologna (IT); Sandra Castaldini, Bologna (IT)

(72) Inventors: Claudio Munerato, Bologna (IT); Sandra Castaldini, Bologna (IT)

(*) Notice: Subject to any disclaimer, the term of this patent is extended or adjusted under 35 U.S.C. 154(b) by 0 days.

(21) Appl. No.: 14/904,635

(22) PCT Filed: Jul. 16, 2014

(86) PCT No.: PCT/IB2014/063156
§ 371 (c)(1),
(2) Date: Jan. 12, 2016

(87) PCT Pub. No.: WO2015/015357
PCT Pub. Date: Feb. 5, 2015

(65) Prior Publication Data
US 2016/0153308 A1    Jun. 2, 2016

(30) Foreign Application Priority Data

Jul. 31, 2013    (IT) .............................. BO2013A0423

(51) Int. Cl.
*F01D 15/10*    (2006.01)
*F03D 80/00*    (2016.01)
(Continued)

(52) U.S. Cl.
CPC .............. *F01D 15/10* (2013.01); *F03D 1/04* (2013.01); *F03D 3/0409* (2013.01); *F03D 9/11* (2016.05);
(Continued)

(58) Field of Classification Search
CPC .......... F01D 15/10; F03D 1/04; F03D 3/0409; F03D 9/11; F05B 2240/941; Y02E 10/72; Y02E 10/74
See application file for complete search history.

(56) References Cited

U.S. PATENT DOCUMENTS 1,460,114 A * 6/1923 Shelton ................. F03D 3/0472
                                                    415/4.2
1,645,855 A * 10/1927 De Vore ................ F03D 3/0409
                                                    415/186
(Continued)

FOREIGN PATENT DOCUMENTS

EP    2003465 A2    12/2008

OTHER PUBLICATIONS

International Search Report and Written Opinion dated Nov. 26, 2014 from counterpart PCT App No. PCT/IB2014/063156.

*Primary Examiner* — Tulsidas C Patel
*Assistant Examiner* — S. Mikailoff
(74) *Attorney, Agent, or Firm* — Shuttleworth & Ingersoll, PLC; Timothy J. Klima (57) ABSTRACT

An auxiliary generator of electrical energy, including an external shell provided with at least one intake opening for a fluid and at least one outlet opening for the fluid; a rotor housed inside the shell along the path of the fluid from said intake opening to said outlet opening; said rotor being provided with a plurality of vanes for intercepting the fluid and with an output shaft; a generator of electrical current housed inside the shell, provided with an input shaft mechanically connected to the output shaft of the rotor, and provided with at least one output electrical terminal; and an at least one accumulator of electrical energy electrically connected to said output electrical terminal.

9 Claims, 11 Drawing Sheets

(51) Int. Cl.
*F03D 9/25* (2016.01)
*F03D 1/04* (2006.01)
*F03D 3/04* (2006.01)
*F03D 9/11* (2016.01)
*F03D 9/32* (2016.01)

(52) U.S. Cl.
CPC .............. *F03D 9/25* (2016.05); *F03D 80/00* (2016.05); *F03D 9/32* (2016.05); *F05B 2240/941* (2013.01); *Y02E 10/72* (2013.01); *Y02E 10/74* (2013.01)

(56) References Cited

U.S. PATENT DOCUMENTS

| | | | | |
|---|---|---|---|---|
| 3,895,882 | A * | 7/1975 | Moyer | F03D 3/0472 415/4.4 |
| 3,902,072 | A * | 8/1975 | Quinn | F03D 3/068 290/44 |
| 3,970,409 | A * | 7/1976 | Luchuk | F03D 7/06 415/4.3 |
| 4,047,834 | A * | 9/1977 | Magoveny | F03D 3/0409 290/55 |
| 4,084,918 | A * | 4/1978 | Pavlecka | F03D 1/04 290/55 |
| 4,134,708 | A * | 1/1979 | Brauser | F03D 3/0472 290/55 |
| 4,236,866 | A * | 12/1980 | Zapata Martinez | F03D 3/02 415/2.1 |
| 4,237,384 | A * | 12/1980 | Kennon | F03D 3/0472 290/44 |
| 4,278,896 | A * | 7/1981 | McFarland | F03D 3/02 290/44 |
| 4,314,160 | A * | 2/1982 | Boodman | B60K 16/00 180/2.2 |
| 4,321,005 | A * | 3/1982 | Black | F03D 3/02 415/123 |
| 4,365,929 | A * | 12/1982 | Retz | F03D 3/04 415/187 |
| 4,424,452 | A * | 1/1984 | Francis | B60K 16/00 290/44 |
| 4,606,697 | A * | 8/1986 | Appel | F03D 3/02 415/4.4 |
| 4,781,523 | A * | 11/1988 | Aylor | F03D 1/04 415/218.1 |
| 5,380,149 | A * | 1/1995 | Valsamidis | F03D 3/0409 415/2.1 |
| 5,746,283 | A * | 5/1998 | Brighton | B60K 16/00 180/65.31 |
| 6,270,308 | B1 * | 8/2001 | Groppel | F03D 3/0472 415/4.3 |
| 6,674,181 | B2 * | 1/2004 | Harbison | F03D 3/02 290/44 |
| 6,700,215 | B2 * | 3/2004 | Wu | B60K 16/00 290/44 |
| 6,749,393 | B2 * | 6/2004 | Sosonkina | F03D 3/02 415/14 |
| 7,135,786 | B1 * | 11/2006 | Deets | B60K 16/00 290/44 |
| 7,172,386 | B2 * | 2/2007 | Truong | F03D 3/0454 290/55 |
| 7,189,051 | B1 * | 3/2007 | Heifets | F03D 3/02 415/224 |
| 7,215,037 | B2 * | 5/2007 | Scalzi | B60K 16/00 290/44 |
| 7,329,965 | B2 * | 2/2008 | Roberts | F03D 3/02 290/44 |
| 7,348,686 | B2 * | 3/2008 | Fielder | F03B 17/061 290/43 |
| 7,456,511 | B1 * | 11/2008 | Chu | F03D 9/002 290/44 |
| 7,880,322 | B2 * | 2/2011 | Cumings | F03D 3/0472 290/54 |
| 8,057,159 | B2 * | 11/2011 | Chong | F03D 3/049 415/4.2 |
| 8,154,145 | B2 * | 4/2012 | Krauss | F03D 3/0409 290/44 |
| 8,253,266 | B2 * | 8/2012 | Elliott | F03D 3/02 290/44 |
| 8,283,799 | B1 * | 10/2012 | Thorpe | F03D 3/065 290/55 |
| 8,362,637 | B2 * | 1/2013 | Kawas | F03D 3/0418 290/44 |
| 8,414,266 | B2 * | 4/2013 | Lam | F03D 3/067 416/147 |
| 8,497,592 | B1 * | 7/2013 | Jones | F03D 9/00 290/44 |
| 8,591,171 | B1 * | 11/2013 | Maynard | F03D 3/0409 415/4.2 |
| 8,704,394 | B1 * | 4/2014 | Jones | F03D 9/00 290/44 |
| 8,786,123 | B2 * | 7/2014 | Bannister | F03D 3/002 290/55 |
| 8,790,068 | B2 * | 7/2014 | Cantwell | F03D 3/02 290/55 |
| 8,967,302 | B2 * | 3/2015 | Tran | B60K 16/00 180/2.2 |
| 9,041,239 | B2 * | 5/2015 | Epstein | F03D 3/065 290/55 |
| 9,115,685 | B2 * | 8/2015 | Ross | F03B 13/264 |
| 9,133,820 | B1 * | 9/2015 | Jones | F03D 3/005 |
| 9,157,414 | B2 * | 10/2015 | Bates | F03D 3/005 |
| 9,203,257 | B1 * | 12/2015 | Zaman | H02J 7/0068 |
| 9,446,670 | B1 * | 9/2016 | McCorkindale | F03D 3/0445 |
| 2003/0035725 | A1 * | 2/2003 | Sosonkina | F03D 3/02 416/11 |
| 2003/0057707 | A1 * | 3/2003 | Wu | B60K 16/00 290/55 |
| 2006/0275105 | A1 * | 12/2006 | Roberts | F03D 3/02 415/4.2 |
| 2007/0098542 | A1 | 5/2007 | Streeman et al. | |
| 2007/0241567 | A1 * | 10/2007 | Platt | F03D 3/0472 290/55 |
| 2008/0272733 | A1 | 11/2008 | Huang | |
| 2009/0045632 | A1 * | 2/2009 | Krauss | F03D 3/0409 290/54 |
| 2009/0091135 | A1 * | 4/2009 | Janca | F03B 13/10 290/54 |
| 2009/0146432 | A1 * | 6/2009 | Ballena | F03D 3/0445 290/55 |
| 2009/0160196 | A1 * | 6/2009 | Metzloff | F03D 3/005 290/55 |
| 2009/0191057 | A1 * | 7/2009 | Knutson | F03D 3/0481 416/23 |
| 2009/0261776 | A1 | 10/2009 | Chang | |
| 2010/0032954 | A1 * | 2/2010 | Law | F03D 3/0454 290/55 |
| 2010/0092290 | A1 * | 4/2010 | Aaron | F03D 3/005 416/9 |
| 2010/0158673 | A1 * | 6/2010 | Keene | F03D 3/0436 415/121.3 |
| 2010/0213722 | A1 * | 8/2010 | Scott | F03D 3/0409 290/55 |
| 2010/0236230 | A1 * | 9/2010 | Khymych | B60K 16/00 60/409 |
| 2011/0031043 | A1 * | 2/2011 | Armani | F03D 9/00 180/2.2 |
| 2011/0070068 | A1 * | 3/2011 | Cumings | F03D 3/0481 415/30 |
| 2011/0117974 | A1 * | 5/2011 | Spitalnik | H01R 31/06 455/573 |
| 2011/0133454 | A1 * | 6/2011 | Vo | F03D 9/007 290/44 |
| 2011/0158787 | A1 * | 6/2011 | Thacker, II | F03D 3/0472 415/1 |
| 2011/0198856 | A1 | 8/2011 | Ling | |
| 2012/0007362 | A1 * | 1/2012 | Bannister | F03D 3/002 290/44 |

(56) References Cited

U.S. PATENT DOCUMENTS

| | | | |
|---|---|---|---|
| 2012/0061965 A1* | 3/2012 | Khedekar | F03D 3/005 290/44 |
| 2012/0112459 A1* | 5/2012 | Crowe | F03D 3/061 290/44 |
| 2012/0112465 A1* | 5/2012 | Morrison | F03D 9/25 290/55 |
| 2012/0119692 A1* | 5/2012 | Ryu | F03D 3/04 320/101 |
| 2013/0009404 A1* | 1/2013 | Trachsell | F03D 13/20 290/55 |
| 2014/0305497 A1* | 10/2014 | Petrosillo | F03D 9/007 136/251 |
| 2015/0098795 A1* | 4/2015 | Gonzalez | F03D 3/0472 415/4.2 |
| 2015/0322920 A1* | 11/2015 | Jones | F03D 9/003 416/1 |

* cited by examiner

AUXILIARY FLUID DRIVEN ELECTRIC GENERATOR

This application is the National Phase of International Application PCT/IB2014/063156 filed Jul. 16, 2014 which designated the U.S. and that International Application was published under PCT Article 21(2) in English.

This application claims priority to Italian Patent Application No. BO2013A000423 filed Jul. 31, 2013, which application is incorporated by reference herein.

TECHNICAL FIELD

The present invention concerns an auxiliary generator of electrical energy.

BACKGROUND ART

In various sectors of the art there is a perceived need for being able, in case of necessity or emergency, or simply for convenience or for ecological reasons, to have available an auxiliary source of electrical energy.

Usually, such auxiliary sources of electrical energy consist of energy accumulators in the form of rechargeable batteries.

The charge capacity of such batteries varies according to whether they are destined for small power users or high power users.

Examples of small power users are cellphones, audio/video players (e.g. mp3 players, tablets) or electronic devices in general, lighting equipment, alarm services, emergency services etc.

Examples of high power users are motors in the automobile sector, but also in the motorcycle and cycle sector, etc.

In various situations, where an electrical energy distribution network is not available, for example in isolated locations far from centres of habitation, the problem of recharging batteries often arises, with the result that once the charge accumulated in them is exhausted, the batteries themselves become unusable.

Furthermore, in the mobility sector there is a particular perceived need to have available a "zero emission" energy source, i.e. one that is capable of making energy available without any release of polluting emissions.

DISCLOSURE OF THE INVENTION

The aim of the present invention is to make available an auxiliary generator of electrical energy which overcomes the disadvantage mentioned above and which satisfies the needs expressed above.

A further aim of the present invention is to make available an auxiliary generator of electrical energy of compact dimensions.

In particular, an aim of the present invention is to make available an auxiliary generator of electrical energy of portable type.

Said aims are fully achieved by the auxiliary generator of electrical energy described herein.

BRIEF DESCRIPTION OF THE DRAWINGS

The characteristics of the auxiliary generator of electrical energy subject of the present invention, will become more apparent from the following description of a preferred embodiment, illustrated, purely by way of non-limiting example, in the attached plates of drawings in which:

FIG. 18b is a view on plan of what is illustrated in FIG. 18a;

FIG. 18c is a side view of what is illustrated in FIG. 18a;

DETAILED DESCRIPTION OF PREFERRED EMBODIMENTS OF THE INVENTION

Figures 1, 1A:
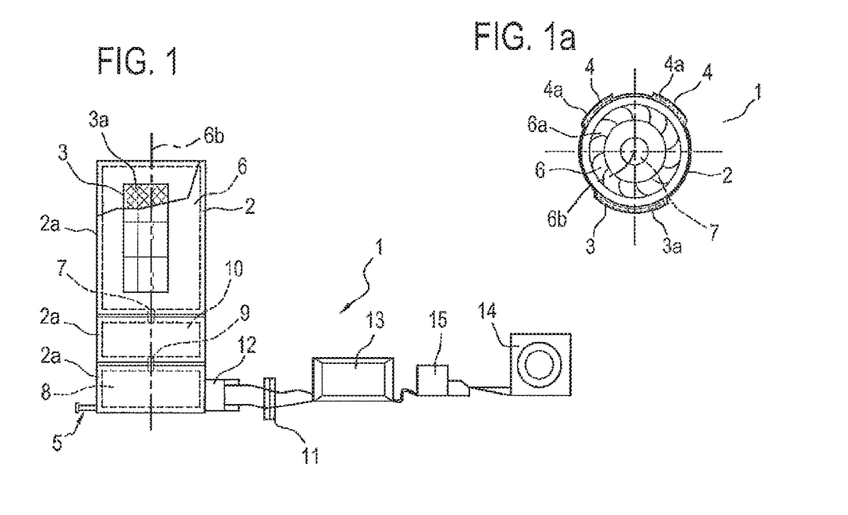
FIG. 1 schematically illustrates a first embodiment of the auxiliary generator of electrical energy which is the subject of the present invention.
FIG. 1a is a view in cross section of what is illustrated in FIG. 1.

With reference to FIGS. 1 and 1a, reference no. 1 indicates an auxiliary generator of electrical energy.

The generator 1 comprises an external shell 2 provided with at least one intake opening 3 for a fluid and at least one outlet opening 4 for the fluid.

Openings 3 and 4 are provided with respective grids 3a and 4a for protection and safety.

The fluid is to be understood to be in relative motion with respect to the generator 1. This fluid can be a gas, particularly air. Alternatively, this fluid can be a liquid, particularly water.

Openings 3 and 4 can be single or multiple. In the specific case, a single inlet opening 3 and two outlet openings 4 are provided, or vice versa.

In particular the shell 2 has a substantially cylindrical shape. Preferably the shell is made of plastic or metal material.

Preferably, furthermore, the shell has a modular structure, i.e. it is compoundable by assembling in axial alignment several elementary blocks 2a, cylindrical in this particular case.

Assembly of the elementary blocks 2a requires them to be fixed to each other by interlocking or by bolting.

Preferably the shell 2 is of compact dimensions, such as to make the generator 1 of portable type and/or easy to install in small spaces.

The shell 2 is advantageously provided with an element 5 for fixing to an external body.

The fixing element 5 can be of clamp type or screw type, or of the type with clips (pincers provided with a spring to return them to the gripping position).

The above-mentioned external body can be, for example, a means of transport.

Examples of applications on means of transport are illustrated in FIGS. 6, 6a, 6b, 6c, 7, 10, 11, 12, 13, 14, 14a, 16 and 16a.

Alternatively, the above-mentioned external body can be, for example, a fixed structure.

Examples of applications on fixed structures are illustrated in FIGS. 17, 17a, 17b, 17c, 18, 18a, 18b and 18c.

The auxiliary generator 1 comprises furthermore a rotor 6 housed inside the shell 2 along the path of the fluid from the intake opening(s) 3 to the outlet opening(s) 4.

The rotor 6 is provided with a plurality of vanes 6a for intercepting the fluid and with an output shaft 7.

Figure 4A:
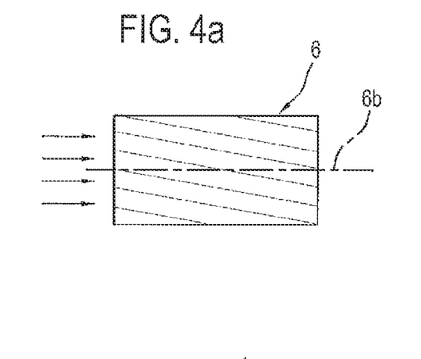
FIGS. 4a, 4b, 5a, 5b, 8, 8a, 15 and 15a represent respective constructive variants of the generator which is the subject of the present invention.
Figure 4B:
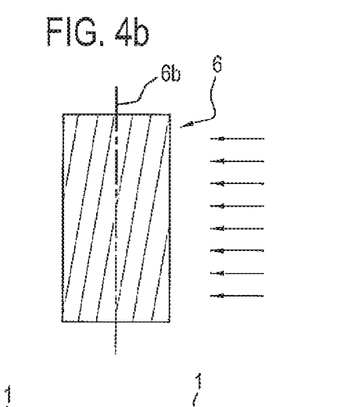

The rotor 6 is arranged inside the shell 2 with its central axis 6b of rotation perpendicular to the path of the fluid from the intake opening(s) 3 to the outlet opening(s) 4 (see FIG. 4b in this connection).

The auxiliary generator 1 comprises furthermore an electric current generator 8, which is also housed inside the shell 2.

The current generator 8 (dynamo or alternator) is provided with an input shaft 9, which is mechanically connected to the output shaft 7 of the rotor 6.

The mechanical connection between the current generator 8 and the rotor 6 can be direct (case not illustrated) or indirect, through a speed multiplier 10. In this case, also the multiplier 10 is housed inside the shell 2 and is physically and mechanically interposed between the output shaft 7 of the rotor 6 and the input shaft 9 of the electric current generator 8.

It should be noted that, in this configuration, a first block 2a of the shell 2 contains the rotor 6, a second block 2a contains the speed multiplier 10 and a third block 2a contains the current generator 8.

The three blocks 2a can, conveniently, have different longitudinal dimensions.

The electric current generator 8 is provided with at least one electric output terminal 11, which depends on an electronic control unit 12 for controlling the generator 8 itself. The control unit 12 can be mounted either outside the shell 2, as in the example shown, or it, too, can be contained inside the shell 2, to be precise, inside block 2a which contains the current generator 8, or inside a respective further block 2a.

An electrical energy accumulator 13, which is electrically connected to the above-mentioned terminal 11, also forms part of the auxiliary generator 1.

The accumulator 13 is in the form of one or more rechargeable batteries, for example of lithium ion type.

According to a first embodiment, the accumulator 13 is arranged outside the shell 2, so as to make its placement independent and more convenient.

Figure 18:
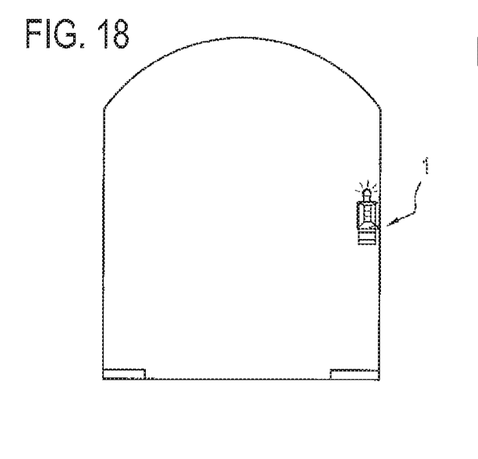
FIG. 18 shows a tenth application of the generator which is the subject of the present invention.
Figure 18A:
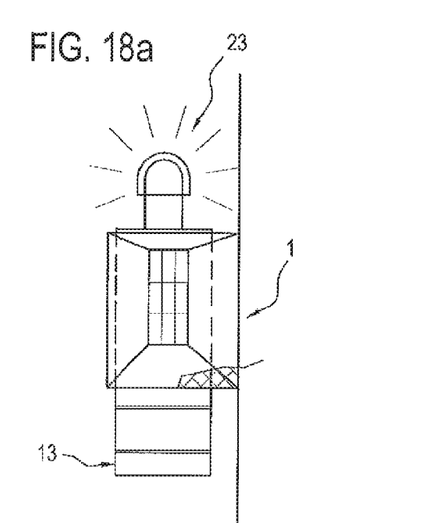
FIG. 18a shows in more detail what is illustrated in FIG. 18.
Figure 18B:
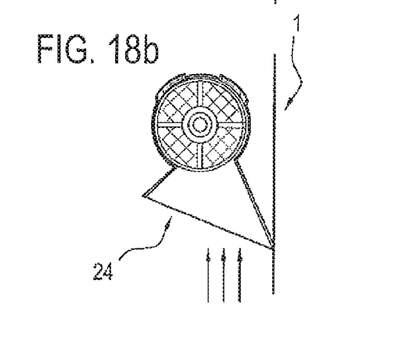
Figure 18C:
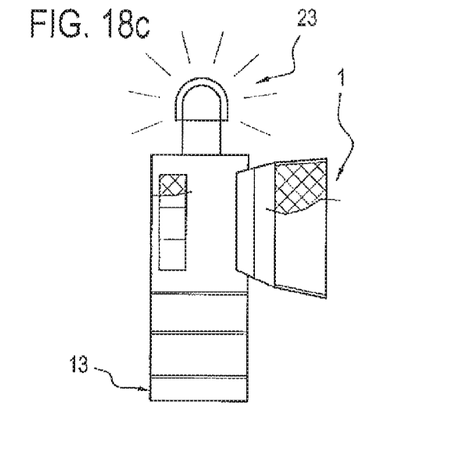
Figure 19:
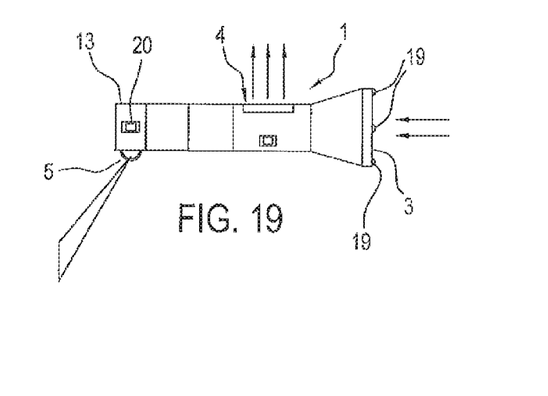
FIG. 19 shows an eleventh application of the generator which is the subject of the present invention.

According to an alternative embodiment, the accumulator 13 is arranged inside the shell 2, so as to make the auxiliary generator 1 more immediately usable, in particular when it is required to be portable (as is evident in FIGS. 18a and 19). In this case, the accumulator 13 can be housed inside a respective further block 2a.

The accumulator 13 can be connected directly to a user 14, or via an inverter 15, depending on whether the user must be supplied in direct current or in alternating current. In this case, too, the inverter 15 can be housed inside a respective further block 2a, or can be arranged outside the shell 2.

It should be noted that the accumulator 13, where it is not integrated into the shell 2, can be removed from the relative housing for subsequent use where necessary or desired.

In this case, the accumulator 13 is arranged in the relative housing and fixed thereto with quick attach/release means.

Figure 2:
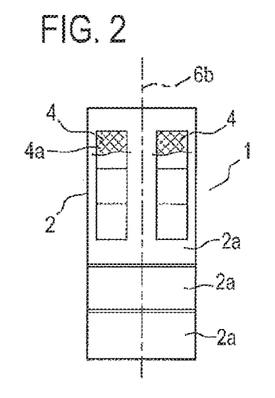
FIG. 2 schematically illustrates a rear view of the auxiliary generator of electrical energy which is the subject of the present invention, referred to in the previous drawings.
Figure 2A:
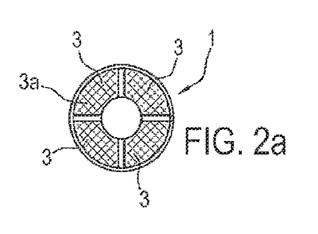
FIG. 2a is a view on plan of what is illustrated in FIG. 2.

In the variant of FIGS. 2 and 2a, in which for simplicity the elements outside the shell 2 are not shown, the rotor 6 is arranged inside the shell 2 with its axis 6b of rotation parallel to the path of the fluid from the intake opening(s) 3 to the outlet opening(s) 4 (see FIG. 4a in this connection). More precisely, in this case four axial intake openings 3, i.e. formed on the circular end of the shell 2, and four lateral output openings 4 (only two of these are shown in FIG. 2), i.e. formed on the cylindrical periphery of the shell 2 are provided.

Alternatively, according to a variant not illustrated, four lateral intake openings 3 (i.e. formed on the cylindrical periphery of the shell 2) and four axial outlet openings 4 (i.e. formed on the circular end of the shell 2) can be provided.

Figure 3:
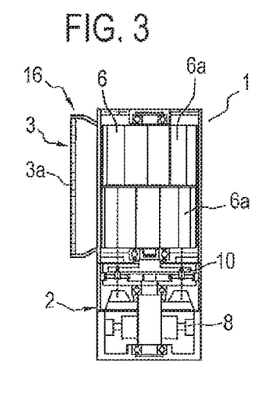
FIG. 3 schematically illustrates a second embodiment of the auxiliary generator of electrical energy which is the subject of the present invention.
Figure 3A:
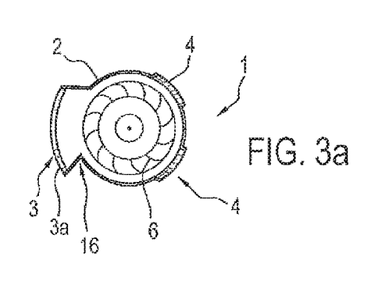
FIG. 3a is a view in cross section of what is illustrated in FIG. 3.
Figure 3B:
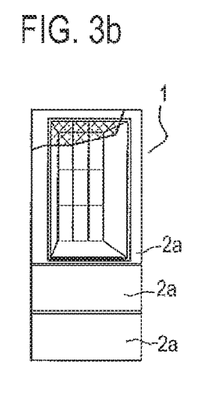
FIG. 3b is a side view of what is illustrated in FIG. 3.

In the variant of FIGS. 3, 3a and 3b the rotor 6 is provided with at least two sections, each provided with a respective configuration of the vanes 6a for intercepting the fluid. Precisely, the configuration of the vanes 6a of one section is different from that of the axially adjacent section, so as to intercept the fluid in a more effective and constant manner.

Figure 8:
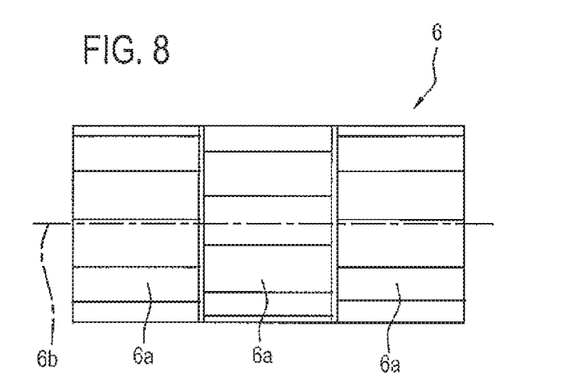
Figure 8A:
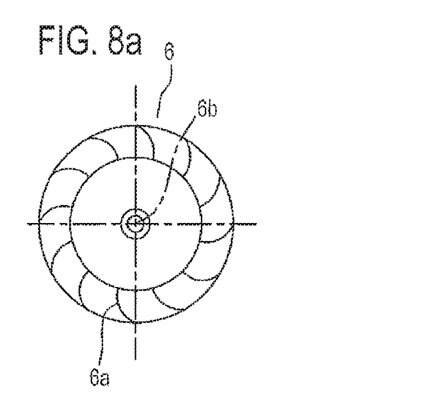

A further example of a multi-section rotor 6 is provided by FIGS. 8 and 8a, which refer to a rotor 6 provided with three axially adjacent sections in sequence.

Furthermore, still with reference to FIGS. 3, 3a and 3b, the intake opening 3, with the respective grid 3a, is mounted on an air conveyor 16 formed by a radially projecting portion of the shell 2. Two outlet openings 4 are also provided, arranged in a position opposite to the intake opening 3.

Figure 5A:
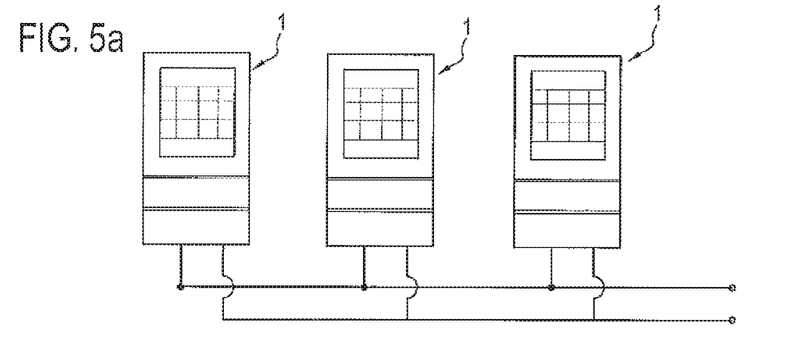
Figure 5B:
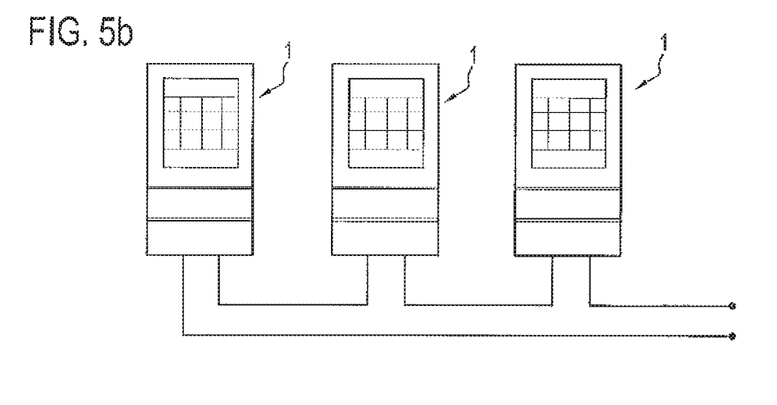

FIGS. 5a and 5b illustrate possible electrical configurations in parallel and, respectively, in series, of several generators 1 subject of the present invention.

FIGS. 6, 6a, 6b and 6c show a generator 1, subject of the present invention, mounted on a car, in particular behind the grid located on the front bonnet.

Figure 6:
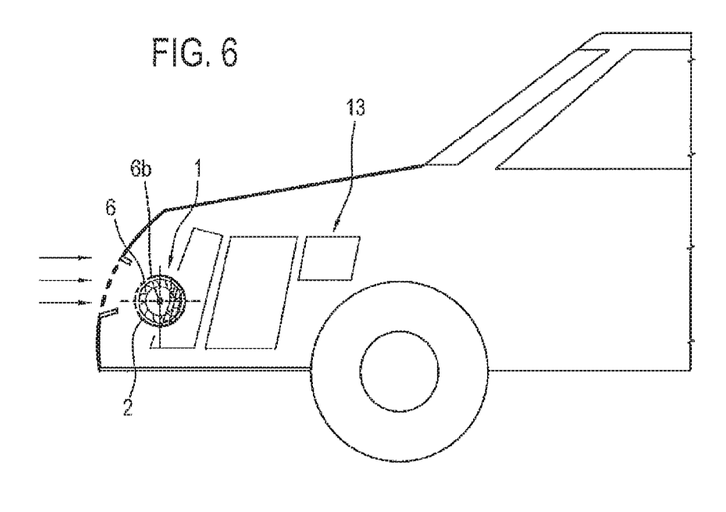
FIGS. 6, 6a, 6b and 6c show a first application of the generator which is the subject of the present invention.
Figure 6A:
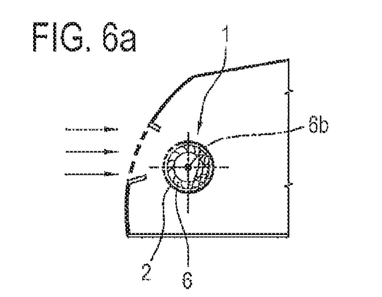
Figure 6B:
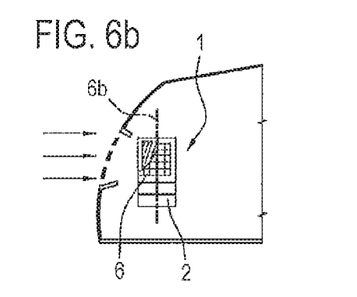
Figure 6C:
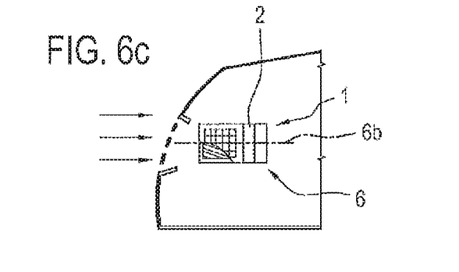

In particular, FIGS. 6, 6a show an installation in which the central axis 6b of the rotor 6 (and of the shell 2) is arranged horizontally and transversely to the airflow generated by the car; FIG. 6b shows an installation in which the central axis 6b of the rotor 6 (and of the shell 2) is arranged vertically and transversely to the airflow generated by the car movement; and FIG. 6c shows an installation in which the central axis 6b of the rotor 6 (and of the shell 2) is arranged horizontally and in the direction of the airflow generated by the car movement.

In relation to the application of the generator 1 on board a vehicle, it should be noted that the movement of the vehicle itself determines a relative speed between the fluid in which the vehicle is immersed (for example, air) and the generator 1 so that the rotor 6 can be driven in rotation by the fluid itself.

The energy available through the accumulator 13 can be used instantly at the moment of generation, i.e. even during the phase of rotation of the rotor 6, besides with rotor 6 stationary.

More generally, the energy made available through the accumulator 13 can be used in any manner, for example to supply electrical systems on the vehicle and/or to convey energy to an electrical network.

Figure 7:
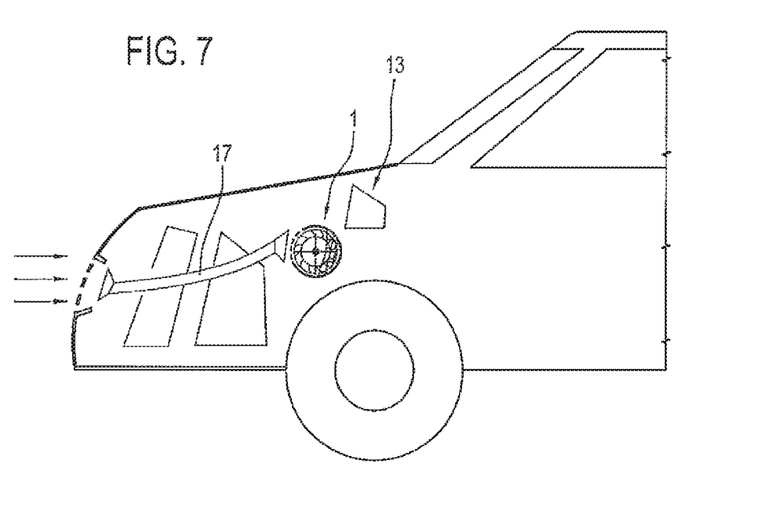
FIG. 7 shows a second application of the generator which is the subject of the present invention.

FIG. 7 shows an installation variant with respect to what has been described with reference to FIGS. 6, 6a, 6b and 6c. In particular a duct 17 for conveying the air is provided, thanks to which the generator 1 can also be positioned in a position distant from the grid located on the front bonnet.

This duct 17 can advantageously also be used in other applications and/or vehicles, to enable the generator 1 to be positioned in any desired position with respect to the external environment.

Figure 9:
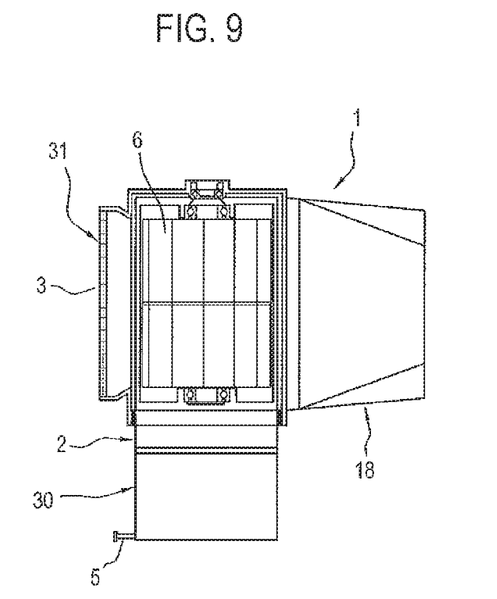
FIG. 9 schematically illustrates a third embodiment of the auxiliary generator of electrical energy which is the subject of the present invention.
Figure 9A:
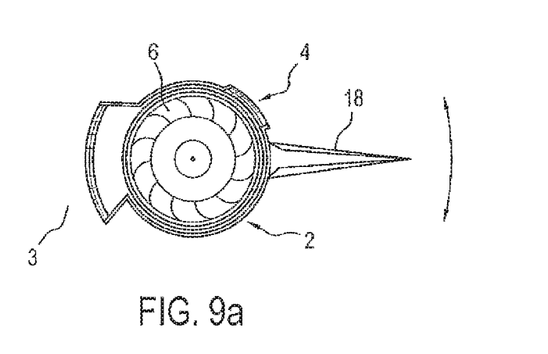
FIG. 9a is a view in cross section of what is illustrated in FIG. 9.
Figure 9B:
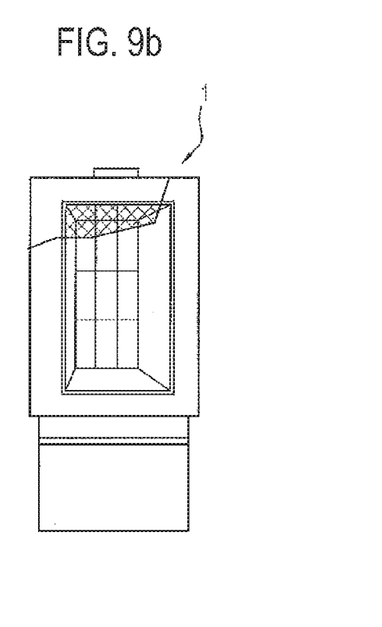
FIG. 9b is a side view of what is illustrated in FIG. 9.

FIGS. 9, 9a, 9b show a variant of what is already described with reference to FIGS. 3, 3a, 3b.

According to this variant, the shell 2 is provided with a sort of weathervane 18 having the function of orienting the generator 1 on the basis of the fluid flow which strikes it.

According to this variant, the generator 1 comprises a first half-shell 30 and a second half-shell 31, rotatably connected to each other.

The first half-shell 30 is preferably the lower half-shell.

The first half-shell 30 is attachable to a frame and the second half-shell 31 can rotate with respect to the first half-shell 30.

The second half-shell 31 is preferably the upper half-shell.

The weathervane 18 is mounted fixed onto the second half-shell 31, so as to be able to rotate with respect to the first half-shell 30.

The second half-shell 31 also carries the intake port and the outlet port, so that the weathervane 18, the intake port and the outlet port are solidly connected to each other.

In this way, advantageously, the generator 1 results in being always oriented in the direction of the wind, so that the quantity of energy produced can be maximised.

In fact, the weathervane 18 (and consequently the second half-shell 31 which carries the intake port and the outlet port) becomes rotated by the wind.

According to this variant a single outlet opening 4 is furthermore provided; however, it is clear that two or more outlet openings 4 could also be provided.

Figure 10:
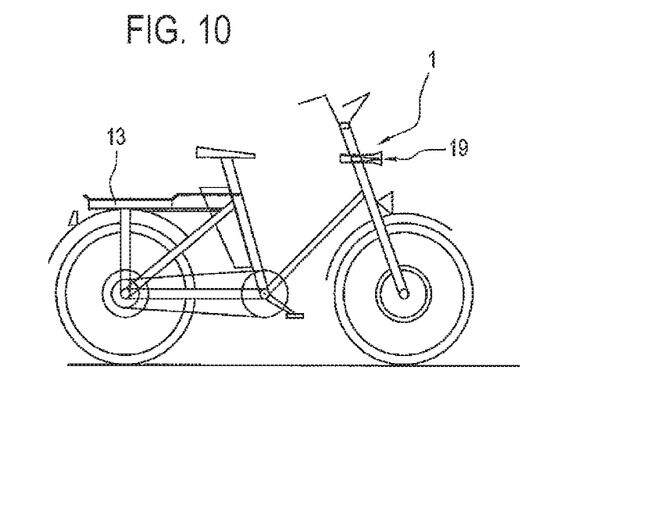
FIG. 10 shows a third application of the generator which is the subject of the present invention.

FIG. 10 shows a generator 1, subject of the present invention, installed on a bicycle.

The generator 1, assembled on the handlebar, can be advantageously equipped with at least one light source 19, which is housed on the outer periphery of the shell 2 and is supplied by the accumulator 13 which is integrated into the inside of the shell 2.

The light source 19 can advantageously constitute the bicycle's lighting device. In this case, the generator 1 can supply energy also to a lamp installed in the rear zone of the bicycle.

Figure 19A:
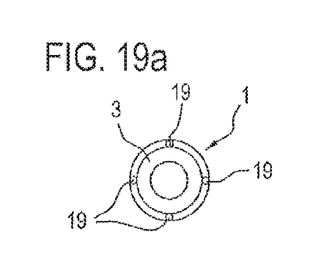
FIG. 19a is a side view of what is illustrated in FIG. 19.

The generator 1 can furthermore be, for example, of the type described in FIGS. 19 and 19a, which illustrate a generator 1 of portable type comprising, besides the above-mentioned light source 19, at least one USB socket 20 for external users. The USB socket 20 is housed on the outer periphery of the shell 2 and is supplied by the accumulator 13 which is integrated into the inside of the shell 2. In this embodiment, the fixing element 5 is advantageously of the quick assembly and quick dismantling type, for example by clips.

Figure 11:
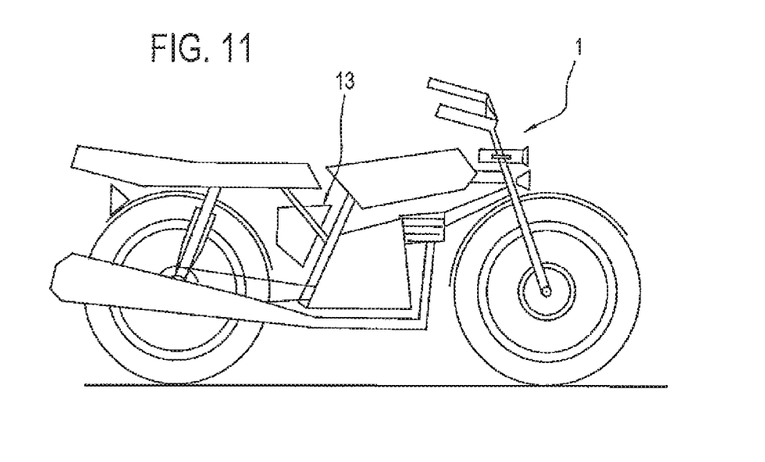
FIG. 11 shows a fourth application of the generator which is the subject of the present invention.

FIG. 11 shows a generator 1, subject of the present invention, installed on a motorcycle. The accumulator 13 can be integrated into the shell 2 or arranged in a remote position.

In the event that the motorcycle is driven by electricity or is of so-called hybrid type, the accumulator 13 can be utilised as an alternative to the basic battery of accumulators for the electric drive, after switching between the two energy sources.

More generally, in the case of a vehicle which comprises both the accumulator 13 and a battery other than the accumulator 13 having the aim of driving the vehicle in motion, it should be noted that switching between the two sources of energy (accumulator 13 and battery) is performed on the basis of a detected voltage value of the accumulator 13 and/or of the battery.

It should be noted that, according to another aspect, the electrical systems (drives etc.) of the vehicle can be supplied, alternatively, by the accumulator 13 or by the battery, depending on a detected voltage value of the accumulator 13 and/or of the battery.

Furthermore, according to this aspect, the generator 1 can be electrically connected to the accumulator 13 or to the battery, to recharge them.

It should be noted that the vehicle comprises a control unit, configured for effecting a double switching:
 a first switching on the electrical systems side (user) which allows either the accumulator 13 or the battery to be electrically coupled to the electrical systems;
 a second switching on the generator side, which allows either the accumulator 13 or the battery to be electrically coupled to the generator 1 to be recharged.

The same considerations hold also in the case, not illustrated, of a car with electric or hybrid drive.

Figure 12:
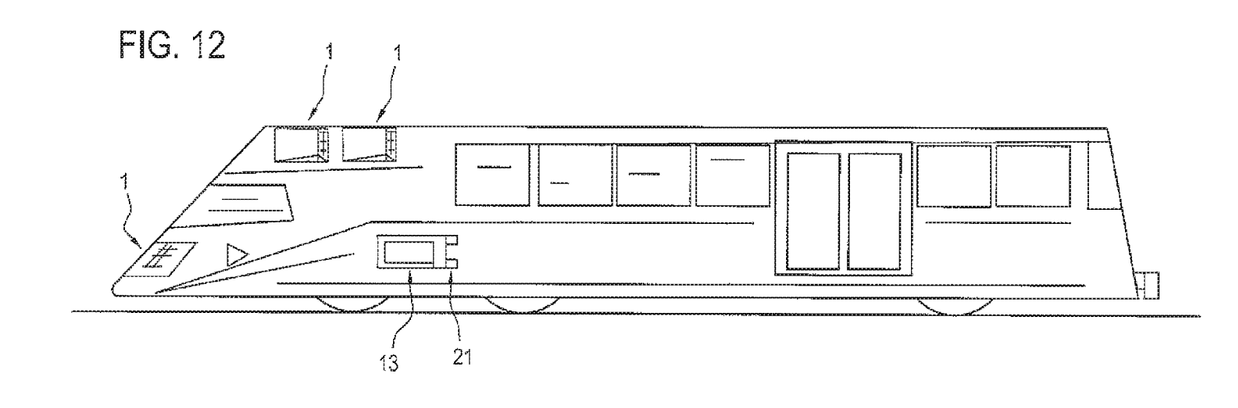
FIG. 12 shows a fifth application of the generator which is the subject of the present invention.
Figure 13:
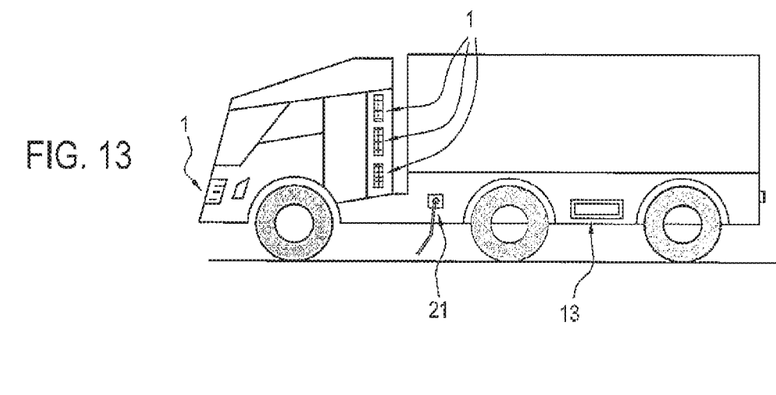
FIG. 13 shows a sixth application of the generator which is the subject of the present invention.
Figure 14:
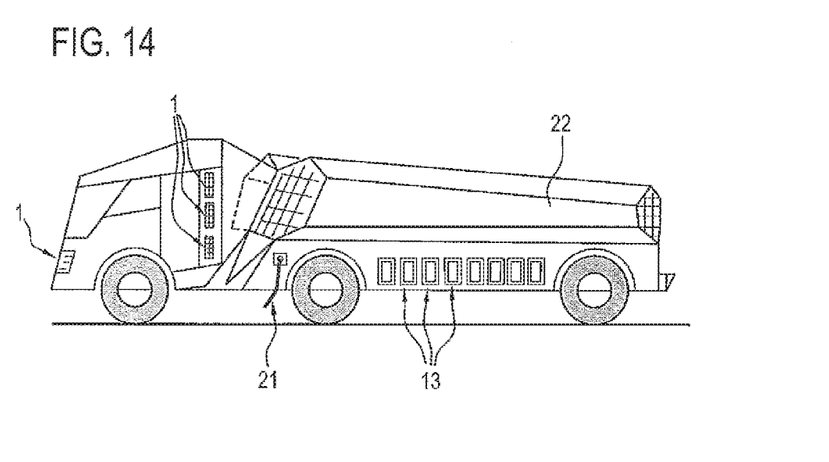
FIG. 14 shows a seventh application of the generator which is the subject of the present invention.
Figure 14A:
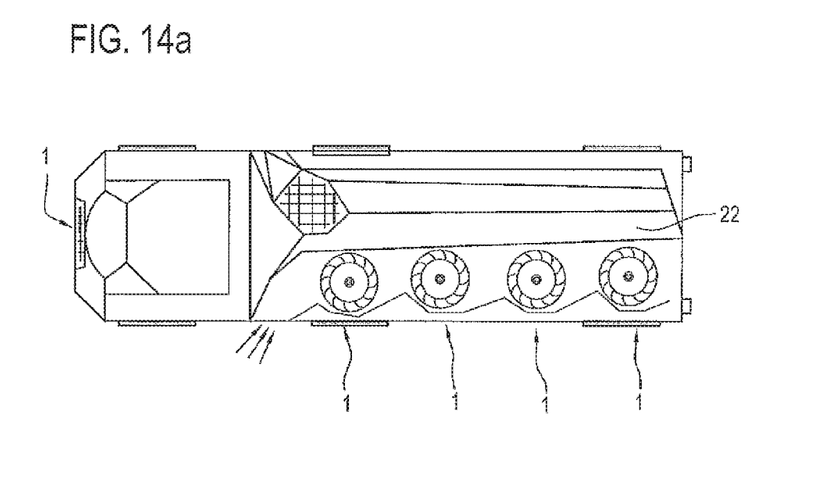
FIG. 14a is a view on plan and in partial section of what is illustrated in FIG. 14.
Figure 15:
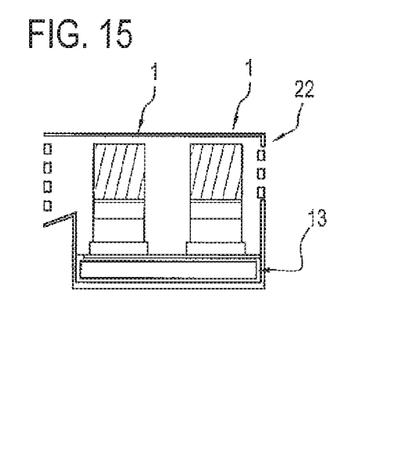
Figure 15A:
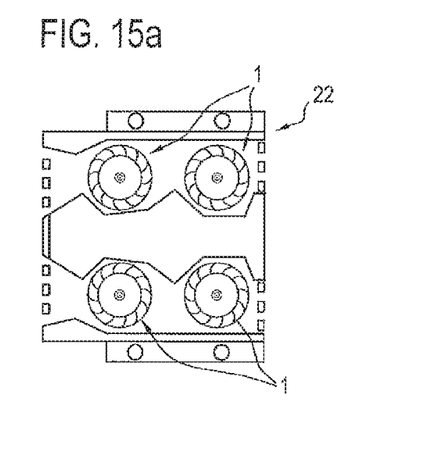
Figure 16:
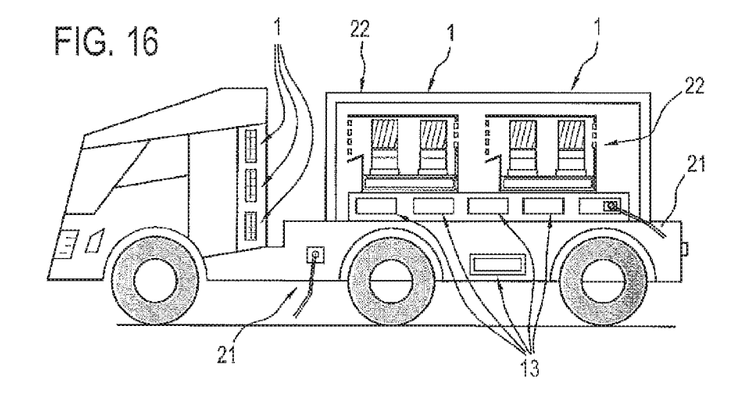
FIG. 16 shows an eighth application of the generator which is the subject of the present invention.
Figure 16A:
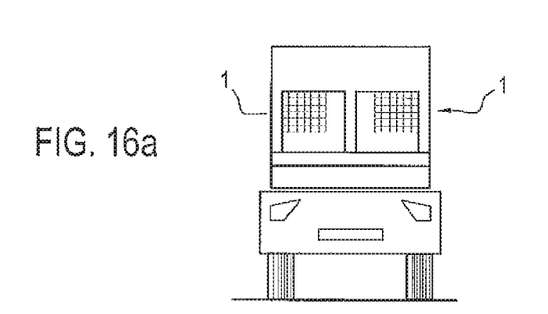
FIG. 16a is a rear view of what is illustrated in FIG. 16.

FIG. 12 shows a plurality of generators 1, subject of the present invention, installed on a railway or subway carriage.

The accumulators 13 (only one shown in the drawing) can be used both during electrical blackouts and in case of faults in the carriage to keep the lights, air conditioning and so forth operating. Furthermore, in the event that the carriage is stationary for ordinary maintenance, the accumulators 13 can provide electrical energy in services to the public, such as for example charging points for cellphones, computers etc.

FIGS. 13, 14, 14a, 16 and 16a show a plurality of generators 1, subject of the present invention, installed on means of transport such as trams and similar. In such installations, no. 21 indicates a socket through which it is possible to exploit the energy accumulated in the accumulators 13, or in the accumulator 13 in the event that there is a single one. In such installations, besides the possibility of electrical configurations in parallel and, respectively, in series according to what is illustrated in FIGS. 5a and 5b, it is possible to physically house the generators in series (cascade) and/or in parallel inside suitable air ducting 22, as is shown in FIGS. 14, 14a, 15, 15a, 16.

Figure 17:
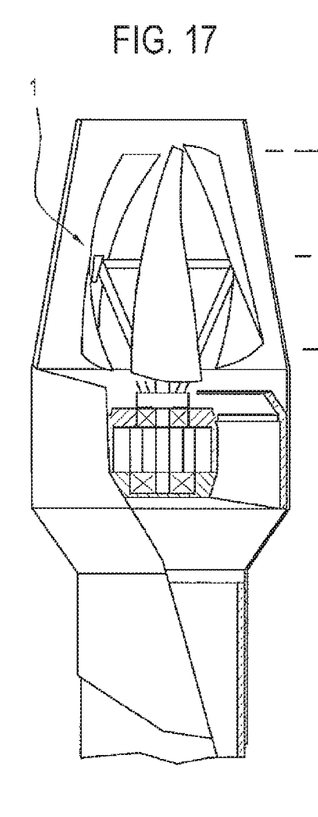
FIG. 17 shows a ninth application of the generator which is the subject of the present invention.
Figure 17A:
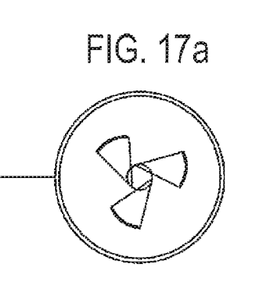
FIGS. 17a, 17b and 17c are respective views in transverse section of what is illustrated in FIG. 17.
Figure 17B:
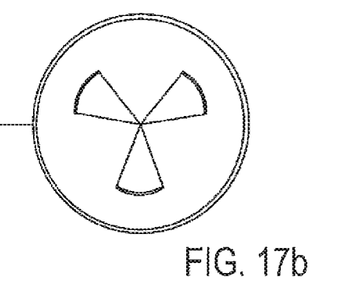
Figure 17C:
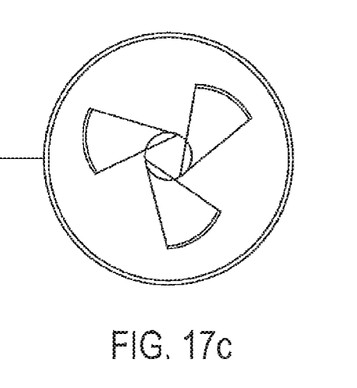

FIG. 17 shows a generator 1, subject of the present invention, installed in a flue in which a fluid flows.

The fluid can be conveyed into the flue by conveying means (ventilators etc.) or as a result of the difference in density between the fluid at the bottom of the flue and the external air.

Preferably, according to this application, the generator 1 is installed in a flue into which a fluid is made to pass at a temperature higher than that of the external air.

Even more preferably, the generator 1 is installed in a flue of a thermal combustion apparatus (such as for example a stove).

The rotor 6 is, in this case, made to rotate from the upward movement of the air.

FIGS. 18, 18a, 18b and 18c show a generator 1, subject of the present invention, installed in a railway tunnel, a subway tunnel or a road/motorway tunnel.

In this case, the generator 1, fixed to a wall of the tunnel, is advantageously provided with a lighting device 23 of its own, having for example the function of signalling or lighting for transport in the tunnel.

In a similar way to what was described with reference to FIGS. 3, 3a and 3b, the generator 1 is furthermore advantageously equipped with an air conveyor 24 formed by a radially projecting portion of the shell 2.

In a further application not illustrated, the generator 1, subject of the present invention, can be installed on the hull of a craft or boat below the waterline.

The invention claimed is:

1. An auxiliary generator of electrical energy, comprising:
    an external shell including an intake opening for a fluid and an outlet opening for the fluid;
    a rotor housed inside the shell along a path of the fluid from said intake opening to said outlet opening; said rotor including a plurality of vanes for intercepting the fluid and an output shaft;
    a generator of electrical current housed inside the shell, the generator including an input shaft mechanically connected to the output shaft of the rotor, and also including an output electrical terminal; and
    an accumulator of electrical energy electrically connected to said output electrical terminal;
    a speed multiplier housed inside the shell and connecting the output shaft of the rotor and the input shaft of the generator of electrical current;
    wherein the shell includes a fixing element for fixing to an external body;
    wherein the rotor is a single rotor, and the output shaft is a single output shaft, the single rotor rotatable around an axis and including a plurality of sections, each of the plurality of sections having a respective configuration of vanes for intercepting the fluid to drive the single rotor; the single output shaft at least partially passing through each of the plurality of sections radially inwardly of the vanes of each of the plurality of sections; the respective configuration of the vanes of each of the plurality of sections being different from the respective configuration of the vanes of an axially adjacent section with respect to at least one chosen from size and shape of the vanes;
    wherein the shell has a modular structure comprising first, second and third elementary blocks assembled in a successive axial alignment;
    the first elementary block containing the rotor;
    the second elementary block containing the speed multiplier; and
    the third elementary block containing the generator;
    the generator comprising an electronic unit for controlling the generator;
    the generator comprising an inverter housed inside the shell.

2. The auxiliary generator of electrical energy according to claim 1, wherein said accumulator is arranged outside the shell.

3. The auxiliary generator of electrical energy according to claim 1, wherein said accumulator is arranged inside the shell.

4. The auxiliary generator of electrical energy according to claim 1, comprising a USB socket for external users, said USB socket being housed on an exterior of said shell and being electrically supplied by said accumulator.

5. The auxiliary generator of electrical energy according to claim 1, comprising at least one light source; said light source being housed on an exterior of said shell and being electrically supplied by said accumulator.

6. The auxiliary generator of electrical energy according to claim 1,
    wherein said external shell comprises a first half-shell and a second half-shell rotatably coupled to each other, said second half-shell including the intake opening and the outlet opening,
    and further comprising a weathervane fixed to the second half-shell so as to rotate the second half-shell and orient the intake opening in a direction of a wind.

7. The auxiliary generator of electrical energy according to claim 1, wherein said rotor is arranged inside the shell with an axis of rotation of the rotor parallel to the path of the fluid from said intake opening to said outlet opening.

8. The auxiliary generator of electrical energy according to claim 1, wherein said rotor is arranged inside the shell with an axis of rotation of the rotor perpendicular to the path of the fluid from said intake opening to said outlet opening.

9. The auxiliary generator of electrical energy according to claim 1, and further comprising a screw fixation for the first, second and third elementary blocks for connecting together the first, second and third elementary blocks.

* * * * *